Patented Oct. 27, 1925.

1,559,289

UNITED STATES PATENT OFFICE.

ROBERT L. SIBLEY, OF ROSELLE PARK, NEW JERSEY, ASSIGNOR TO STANDARD DEVELOPMENT COMPANY, A CORPORATION OF DELAWARE.

COATING COMPOUND, MOLD, AND METHOD OF PREPARING MOLDS AND SURFACES INVOLVED IN MOLDING OPERATIONS.

No Drawing.     Application filed October 10, 1923. Serial No. 667,693.

*To all whom it may concern:*

Be it known that I, ROBERT L. SIBLEY, a citizen of the United States, residing at Roselle Park, in the county of Union and State of New Jersey, have invented new and useful Improvements in Coating Compounds, Molds, and Methods of Preparing Molds and Surfaces Involved in Molding Operations, of which the following is a specification.

This invention relates to the preparation of molds and surfaces involved in molding operations, and will be fully understood from the following description.

In the molding of plastic materials, particularly where reactive chemical substances are present and heat and pressure are employed, as in vulcanizing rubber, the molded articles tend to stick tenaciously to the molds. Various expedients have been proposed for the preparation of mold surfaces, to prevent such sticking; but the final stripping of the articles from the molds has continued to be a laborious and time-consuming operation, besides incurring damage to the molds.

In accordance with the present invention I am enabled to make available the molds of existent types without taking recourse to constructing special liner plates, etc., or requiring special metals. In carrying out my invention I apply to the molding surface a coating of material particularly operative against sticking. This material is obtained incidental to refining hydrocarbon oils. When mineral oils are treated with refining agents certain compounds separable from the oil are formed. These comprise sulfonic compounds and napthenic compounds, and either may be had in their acid state, or as salts of sodium or other bases, and in any desired degree of purity. Moreover, either oil-soluble or water-soluble sulfonic compounds may be had.

All of these have their uses within the broader purview of this invention, but for the finer grades of work I prefer a purified water-soluble sodium sulfonate, such, for example, as is obtained when a mid-continent lubricating-oil stock is treated with fuming sulfuric acid, the sludge from the second 5–10% dump of acid being separated from the oil and purified in any suitable way (as for instance by dissolving in water and "salting out" with sodium chlorid, or by washing with hot concentrated sodium chlorid solution), and the resultant sulfonic acid being then neutralized with caustic soda solution. The sodium sulfonate so obtained is freely soluble in water, and in fact as obtained runs as high as 50% moisture content.

By making up in dilute aqueous solution, for example 1 to 15% based on dry weight, the most convenient form for the purposes of this invention may be had. Depending upon the particular molds to be treated I apply such solution in a manner as may in each case be expedient and efficient. For instance, gang molds for mechanical goods may be carried along on a conveyor past a sprayer which sprays the sodium sulfonate solution onto the molding surfaces. In some cases the solution may be applied by a brush roll fed by fountain or feed roll. Core molds may be coated by immersion. With large and complicated face molds a hand-operated brush or a spray may be best. The molds are ready for use, after preferably a brief drying sufficient to eliminate excess water liable to cause pitting in the subsequent vulcanzing operation.

Where using vulcanizing presses as in belt work and the like, the platens and leaves of the press may be coated. By coating the rubber surfaces, rubber layer may be laid directly against rubber layer, as may be desirable in some cases where sheet or plate stock or the like is to be vulcanized in a stack in press or roll. In fact wherever it is desired that rubber shall not stick to rubber in the vulcanization, but remain non-adherent in whole, or in part as in the forming of flaps, handles, etc., on molded goods, I may coat the surfaces to be non-adherent with the materials contemplated in this invention. In this way mold design may sometimes be simplified.

Aside from rubber, my invention is also applicable in the molding of other substances where mold-sticking is a problem, as for instance resins, natural or artificial, etc., asphalts, etc., also inorganic substances.

It is not necessary in all cases to use such pure material as aforedescribed for coating the molding surfaces. In the commoner forms of molding much less purification or substantially none will be satisfactory in some instances. Residual sulfuric acid and asphaltic substances if present in the sludge ought however, in general, to be eliminated. Asphaltic impurities may be avoided generally by avoiding the use of first dump sludge. In some cases of coarse molding, a sulfonic acid sludge may be used direct without conversion to sulfonate by sodium or lime; if the mold surfaces are metallic, however, corrosion will gradually be produced by the slowly acting sulfonic acid.

Oil-soluble sulfonic compounds are less desirable in the purposes of this invention than water-soluble sulfonic compounds, and are besides more expensive, being separated from the oil which has been treated with fuming or concentrated sulfuric acid by extracting with alcohol or other preferential solvent or by distilling off the oil. Naphthenic compounds while available, are less desirable on account of their odor. They should not be used with rubber, but are feasible for coarse kinds of molding.

While I have described my invention by reference to certain specific details, it will be understood that this is illustrative rather than limitative, and changes may be made which come within the spirit and scope of the invention.

I claim:

1. The method of preparing vulcanizing molds, which comprises spraying the molding surfaces with a dilute aqueous solution of sodium sulfonate.

2. The method of preparing molds, which comprises coating the molding surfaces with an aqueous solution of sodium sulfonate.

3. The method of preparing molds, which comprises coating the molding surfaces with a sulfonic compound.

4. The improvement in the art of molding rubber goods, which comprises coating with sodium sulfonate, surfaces intended to be non-adherent.

5. The improvement in the art of molding rubber goods, which comprises coating with a petroleum sludge component, surfaces which are intended to be non-adherent.

6. The method of preparing molds, which comprises coating the molding surfaces with a hydrocarbon sludge component.

7. A mold coated with a sulfonic compound.

8. A mold coated with a hydrocarbon sludge component.

9. A coating for surfaces intended to be non-adherent, which comprises a sulfonic compound.

10. A coating for surfaces intended to be non-adherent, which comprises a hydrocarbon sludge component.

ROBERT L. SIBLEY.